US011034067B2

(12) United States Patent
Lee et al.

(10) Patent No.: US 11,034,067 B2
(45) Date of Patent: Jun. 15, 2021

(54) CFT PRE-FORMING INSERT INJECTION MOLDED SEAT BACK FRAME

(71) Applicant: LG HAUSYS, LTD., Seoul (KR)

(72) Inventors: Kyung-Hoon Lee, Seoul (KR); Yong-Kil Kil, Gimpo-si (KR); Kwon Taek Kim, Anyang-si (KR); Yong-Han Kang, Seoul (KR)

(73) Assignee: LG HAUSYS, LTD., Seoul (KR)

( * ) Notice: Subject to any disclaimer, the term of this patent is extended or adjusted under 35 U.S.C. 154(b) by 0 days.

(21) Appl. No.: 15/775,998

(22) PCT Filed: Nov. 11, 2016

(86) PCT No.: PCT/KR2016/013035
§ 371 (c)(1),
(2) Date: May 14, 2018

(87) PCT Pub. No.: WO2017/082693
PCT Pub. Date: May 18, 2017

(65) Prior Publication Data
US 2018/0326630 A1    Nov. 15, 2018

(30) Foreign Application Priority Data

Nov. 13, 2015 (KR) ........................ 10-2015-0159793

(51) Int. Cl.
*B60N 2/68* (2006.01)
*B29C 45/14* (2006.01)
(Continued)

(52) U.S. Cl.
CPC .. *B29C 45/14786* (2013.01); *B29C 45/14221* (2013.01); *B29C 70/20* (2013.01);
(Continued)

(58) Field of Classification Search
CPC ..................................................... B60N 2/686
See application file for complete search history.

(56) References Cited

U.S. PATENT DOCUMENTS 7,731,293 B1 *  6/2010  Donovan ............... B60N 2/686
                                                            297/452.18
9,254,770 B2 *  2/2016  Nuyan .................. B60N 2/682
(Continued)

FOREIGN PATENT DOCUMENTS

CN    104816661 A    8/2015
CN    204586596 U    8/2015
(Continued)

OTHER PUBLICATIONS

International Search Report for corresponding international application PCT/KR2016/013035 dated Mar. 13, 2017, citing the above references.

(Continued)

*Primary Examiner* — Timothy J Brindley
(74) *Attorney, Agent, or Firm* — Hauptman Ham, LLP

(57) ABSTRACT

The present invention provides a CFT pre-forming insert injection molded seat back frame. The CFT pre-forming insert injection molded seat back frame comprises: a pair of frame parts which are coupled to face each other and have fiber reinforced plastic formed therein; and reinforcement parts which are formed on regions that the pair of frames respectively face, and are coupled to each other in multiple locations.

10 Claims, 17 Drawing Sheets

(51) Int. Cl.
*B29D 99/00* (2010.01)
*B29C 70/20* (2006.01)
*B29L 31/00* (2006.01)

(52) U.S. Cl.
CPC ........... *B29D 99/0092* (2013.01); *B60N 2/68* (2013.01); *B60N 2/686* (2013.01); *B29C 2045/14245* (2013.01); *B29C 2791/001* (2013.01); *B29L 2031/771* (2013.01)

(56) References Cited

U.S. PATENT DOCUMENTS

| | | | | |
|---|---|---|---|---|
| 2005/0168041 | A1* | 8/2005 | Glance | B60N 2/68 297/452.18 |
| 2015/0145276 | A1* | 5/2015 | Preisler | B60R 13/011 296/97.23 |
| 2015/0210194 | A1* | 7/2015 | Furuta | B60N 2/68 297/391 |
| 2015/0224901 | A1* | 8/2015 | Furuta | B60N 2/68 297/452.18 |
| 2015/0274051 | A1* | 10/2015 | Mueller | B60N 2/68 296/68.1 |
| 2018/0170217 | A1* | 6/2018 | Galbreath | B60N 2/99 |

FOREIGN PATENT DOCUMENTS

| | | |
|---|---|---|
| JP | 4756532 B2 | 8/2011 |
| KR | 10-2010-0097776 A | 9/2010 |
| KR | 10-2012-0107629 A | 10/2012 |
| KR | 10-2013-0014854 A | 2/2013 |
| KR | 10-1247310 B1 | 3/2013 |
| KR | 10-1278901 B1 | 6/2013 |
| KR | 10-2013-0073961 A | 7/2013 |
| KR | 10-2015-0103438 A | 9/2015 |
| WO | 2013/127972 A2 | 9/2013 |

OTHER PUBLICATIONS

Chinese Office Action dated Apr. 23, 2020 in connection with the counterpart Chinese Patent Application No. 201680066356.2, citing the above reference(s).

* cited by examiner

CFT PRE-FORMING INSERT INJECTION MOLDED SEAT BACK FRAME

CROSS REFERENCE TO RELATED APPLICATION

This present application is a national stage filing under 35 U.S.C § 371 of PCT application number PCT/KR2016/013035 filed on Nov. 11, 2016 which is based upon and claims the benefit of priority to Korean Patent Application No. 10-2015-0159793 filed on Nov. 13, 2015 in the Korean Intellectual Property Office. The disclosures of the above-listed applications are hereby incorporated by reference herein in their entirety.

TECHNICAL FIELD

The present invention relates to a seat back frame, and more particularly, to a CFT pre-forming insert injection molded seat back frame capable of securing the strength and the rigidity by constituting a plurality of ribs in a structure shape and a frame itself.

BACKGROUND ART

Generally, a seat back of a vehicle is a means for providing a comfortable and easy boarding environment by supporting a passenger's back by being connected to a seat cushion for supporting a passenger's hips.

Such a seat back is usually molded to a plastic material, and forms a rib or a channel on the rod-reinforced seat back frame to maintain the strength.

In addition, although there is an example that the steel reinforcement bracket or a plate-like reinforcement material, such as a steel type is used to further reinforce the strength, in this case, the weight is sharply increased, and thus, it has the disadvantage unfavorable in terms of competitiveness and is highly unfavorable in terms of rigidity.

Particularly, in the case of a two-row seat back frame of a passenger vehicle or a three-row seat back frame of a people carrier, due to an external collision, it may directly collide with the luggage loaded on the trunk, and the frame itself may be broken.

Conventionally, the seat back frame was compression-molded having GMT (Glass Mat Thermoplastics) and LFT (Long Fiber reinforced Thermoplastics) as the material to secure the rigidity due to the collision.

The seat back frame thus formed largely consists of a front frame and a back frame.

The rib is not formed on the backside of the conventional front frame and is formed to have a flat plate shape.

Further, the rib is manufactured to be formed on the front side of the back frame coupled with the backside of the front frame.

The back frame serves as a main frame and the front frame serves as an auxiliary frame.

Accordingly, there is a problem that the front frame is easily broken when the seat back frame directly collides with the luggage loaded on the trunk due to an external collision, due to the elimination of the rib for reinforcement at the front frame.

Prior art related to the present invention is Korean Patent Laid-Open Patent Publication No. 10-2013-0014854 (published date: Feb. 12, 2013), which discloses a technology with regard to a sandwich structure of a seat back frame.

DISCLOSURE

Technical Problem

It is an object of the present invention to provide a CFT pre-forming insert injection molded seat back frame which can secure its own strength and rigidity by forming a plurality of ribs symmetrical to each other on a coupling surface of each of a pair of frames.

Another object of the present invention is to provide a CFT pre-forming insert injection molded sheet back frame to increase the strength and the rigidity by molding the plurality of ribs through the injection molding, after pre-forming molding the continuous fiber reinforced thermoplastic.

It is a another object of the present invention to provide a CFT pre-forming insert injection molded sheet back frame which the front frame serves as the main frame and has the shape such as a center mounting part, a side mounting part, and a headrest mounting part which are connected with the vehicle body as well as the rib, and the back frame has the plurality of ribs as the auxiliary frame function.

Technical Solution

In a preferred aspect, the present invention provides a CFT pre-forming insert injection molded seat back frame.

The seat back frame includes a pair of frame parts which are coupled to face each other and the fiber reinforced plastic is formed therein; and reinforcement parts which are formed on the region respectively face of the pair of frames and are coupled each other in multiple locations.

It is preferable that the pair of the frame parts includes the front frame which the first coupling region is formed on one surface and the back frame which the second coupling region facing with the first coupling region on one surface is formed.

It is preferable that the opposed region includes the first coupling region and the second coupling region.

It is preferable that the reinforcement parts have a plurality of first reinforcement ribs which are protrusion-formed on the first coupling region and a plurality of second reinforcement ribs which are protrusion-formed on the second coupling region coupled with the plurality of first reinforcement ribs.

It is preferable that the plurality of first reinforcement ribs and the plurality of second reinforcement ribs are formed to be symmetrical to each other.

It is preferable that the plurality of first reinforcement ribs and the plurality of second reinforcement ribs are coupled to each other by mechanical fastening using a fusion or a fastening bolt.

The plurality of first reinforcement ribs and the plurality of second reinforcement ribs may be coupled by fitted to each other.

It is preferable that the fiber reinforcement plastic is formed inside the reinforcement parts.

It is preferable that the pair of the frame parts may be manufactured by forming to the pre-forming molding having the pre-forming shape by pressing it in order to have the predetermined shape through the pre-forming molding and by injection molding the pre-forming molding by using the other thermoplastic while simultaneously forming the reinforcement parts.

The pair of the frame parts may be also manufactured by forming the pre-forming which the reinforcement parts are formed by pressing it in order to have the determined shape through the pre-forming molding and injection molding the pre-forming molding by using the other thermoplastic.

Also, the CFT pre-forming insert injection molded seat back frame of the present invention may include a pair of frame parts including a front frame coupled to face each other, and a back frame coupled to the front frame; and reinforcement parts including a plurality of first reinforcement ribs formed on the front frame.

Here, it is preferable that the first reinforcement ribs are protrusion formed on the first coupling region formed on the front frame.

Advantageous Effects

The present invention has the effect of securing its own strength and rigidity by forming a plurality of ribs symmetrical to each other on the coupling surfaces of each of a pair of frames which are coupled to face each other.

Also, the present invention has the effect of increasing the strength and rigidity of the frame through the shape consisting of a plurality of ribs through injection molding after pre-forming molding the continuous fiber reinforced thermoplastic.

BEST MODE

Hereinafter, a CFT pre-forming insert injection molded sheet back frame according to the present invention will be described with reference to the accompanying drawings.

Figure 1:
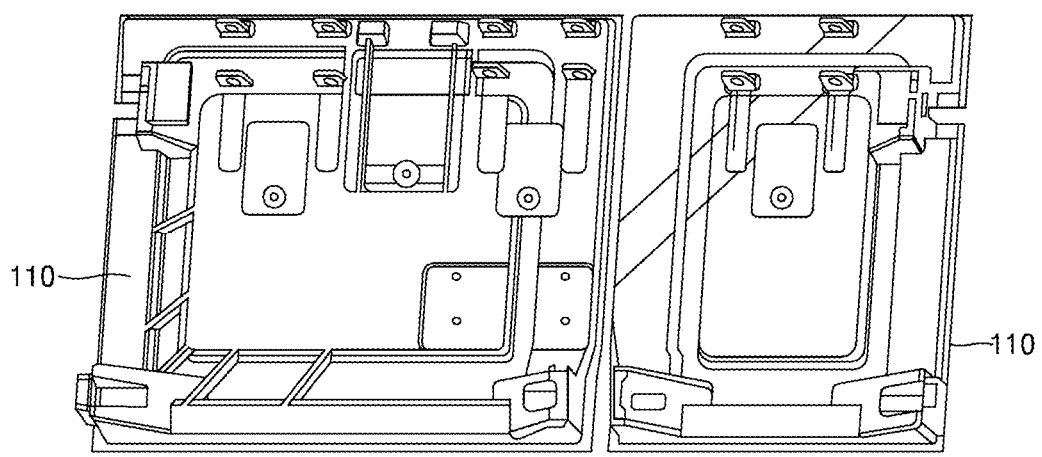
FIG. 1 is a view showing a front side of the front frame according to the present invention.
Figure 2:
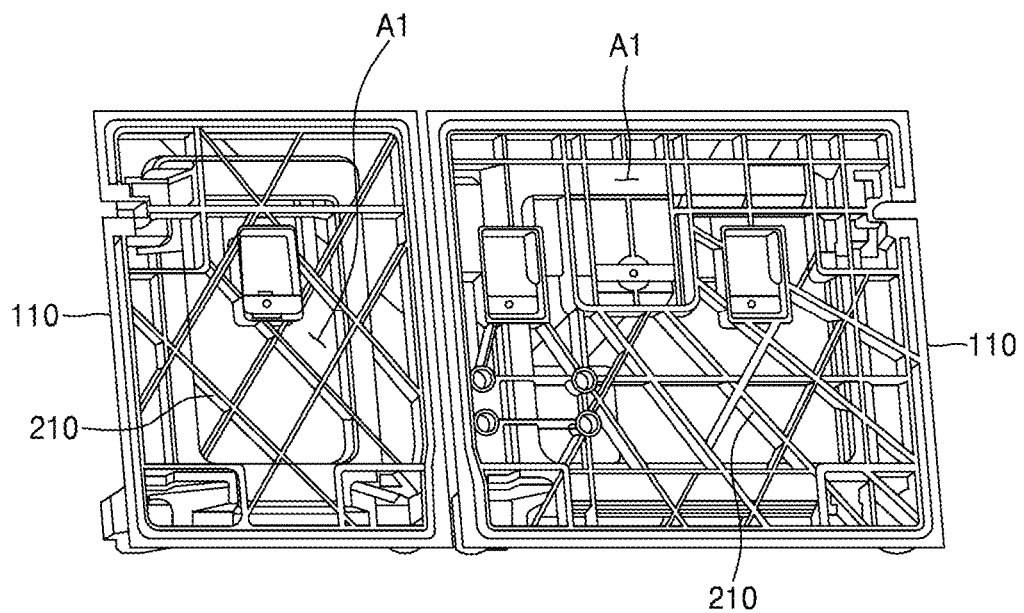
FIG. 2 is a view of showing a rear side of the front frame according to the present invention.
Figure 3:
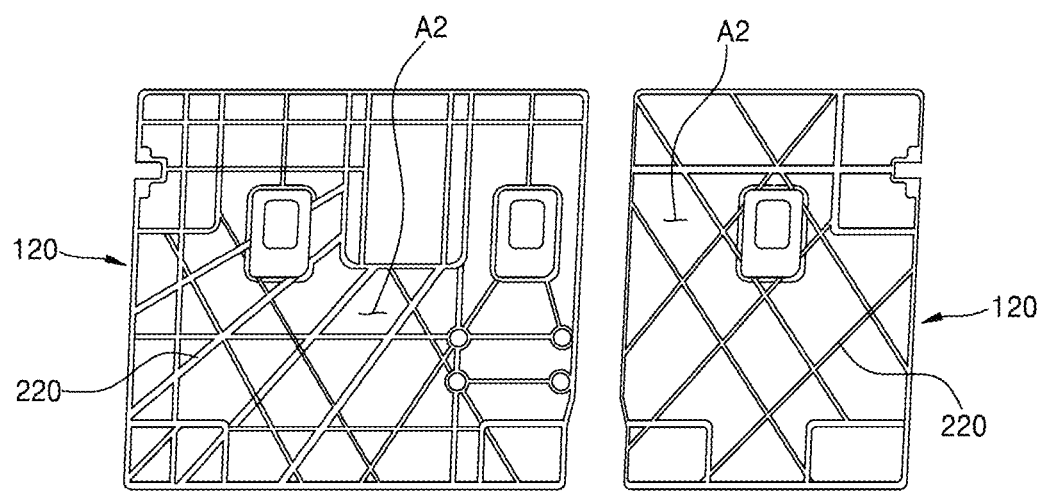
FIG. 3 is a view of showing a front side of the back frame according to the present invention.
Figure 4:
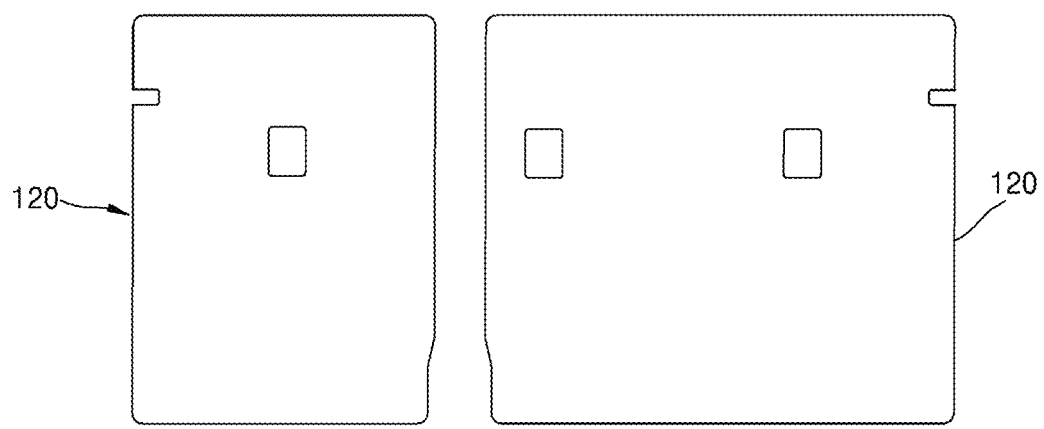
FIG. 4 is a view of showing a rear side of the back frame according to the present invention.

FIG. 1 is a view showing a front side a front frame according to the present invention, FIG. 2 is a view showing a rear side of a front frame according to the present invention, FIG. 3 is a view showing a front side of a back frame according to the present invention, and FIG. 4 is a view showing a rear side of a back frame according to the present invention.

With reference to FIG. 1, FIG. 2, FIG. 3 and FIG. 4, a front frame 110 and a back frame 120 constituting the CFT pre-forming insert injection molded seat back frame of the present invention will be described.

The hatchback seat back frame according to the present invention may be consisted of a two-row or three-row seat of a vehicle The seat back frame of the present invention is constituted of a pair of the frame parts 100 and reinforcement parts 200.

The pair of frame parts 100 is constituted of a front frame 110 and a back frame 120.

As shown in FIG. 1, a structure having a predetermined shape is protrusion formed on the front side of the front frame 110.

Referring to FIG. 2, a first coupling area A1 is formed on a rear side of the front frame 110.

Also, a second engagement region A2 is formed on the front side of the back frame 120, and a backside thereof is formed in a flat plate shape.

Here, the first coupling region A1 and the second coupling region A2 are arranged to face each other.

The reinforcement parts 200 are formed in a facing area of each of the pair of frame parts 100 and are coupled to each other in multiple locations.

The facing regions are the first and second coupling regions A1 and A2 described above.

The reinforcement parts 200 are constituted of a plurality of first reinforcement ribs 210 and a plurality of second reinforcement ribs 220.

The plurality of first reinforcement ribs 210 are formed to be protruded at the first coupled region A1 of the front frame 110.

Also, the plurality of second reinforcement ribs 220 are formed to be protruded at the second coupling region A2 of the back frame 120.

Here, the plurality of first and second reinforcement ribs 210 and 220 are formed to have the same pattern.

Preferably, when the front frame 110 and the back frame 120 are coupled to face each other, they have the predetermined height from the bottom surface of the corresponding coupling region of the corresponding frame such that the ends of the plurality of first and second reinforcement ribs 210, 220 are adhered to each other.

Figure 5:
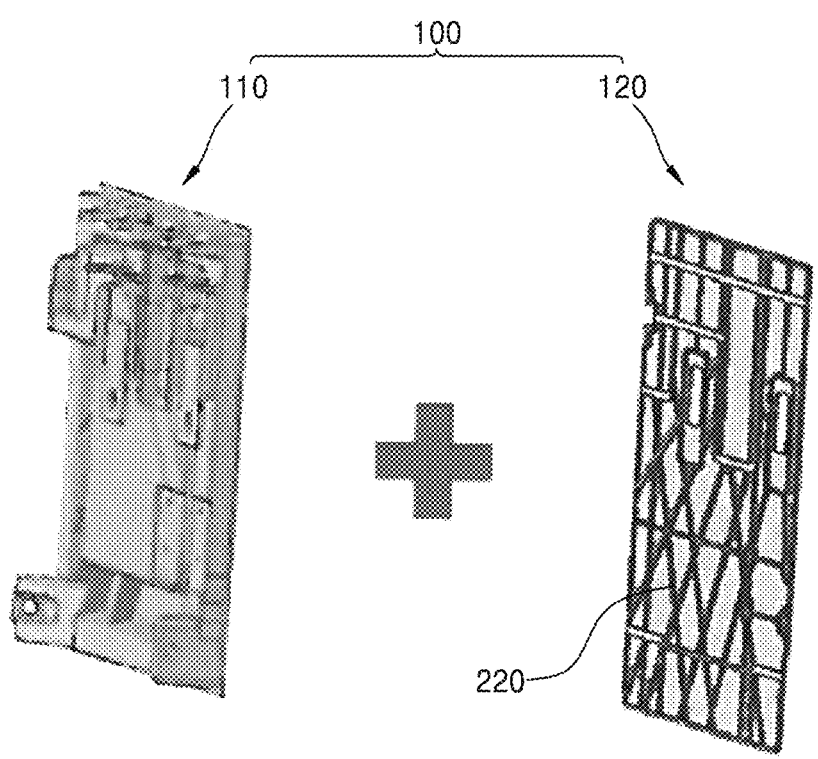
FIG. 5 is a perspective view of showing a state that the front frame and the back frame are coupled according to the present invention.

FIG. 5 is a perspective view showing a state in which a front frame and a back frame are combined according to the present invention.

The front frame 110 and the back frame 120 according to the present invention are coupled such that the first and second coupled regions A1 and A2 face each other.

At this time, the ends of the plurality of first reinforcement ribs 210 and the plurality of second reinforcement ribs 220 are in a state adhered to each other.

The following describes the coupling relationship of the plurality of first and second reinforcing ribs 210 and 220 according to the present invention.

Figure 6:
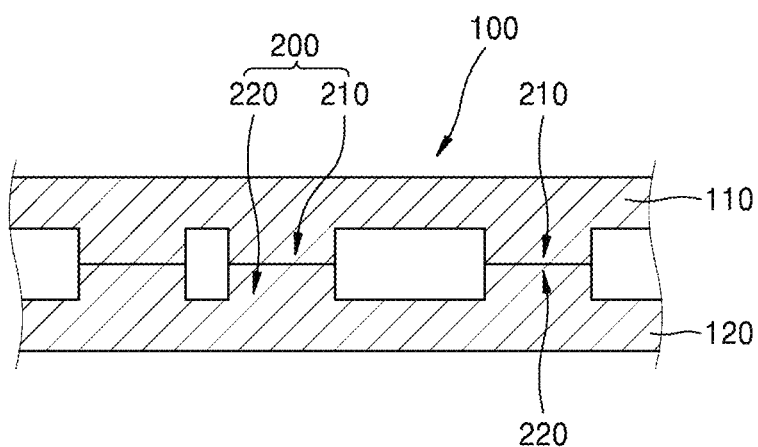
FIG. 6 is a partial cross-sectional view showing an example in which a plurality of first and second reinforcement leads according to the present invention are coupled through the fusion.

FIG. 6 is a partial cross-sectional view showing an example in which a plurality of first and second reinforcement ribs according to the present invention are coupled through the fusion.

Referring to FIG. 6, the ends of the first and second reinforcement ribs 210 and 220 are adhesion coupled, by coupled through a vibration fusion, an IR fusion, a vibration fusion, and a heat fusion.

Figure 7:
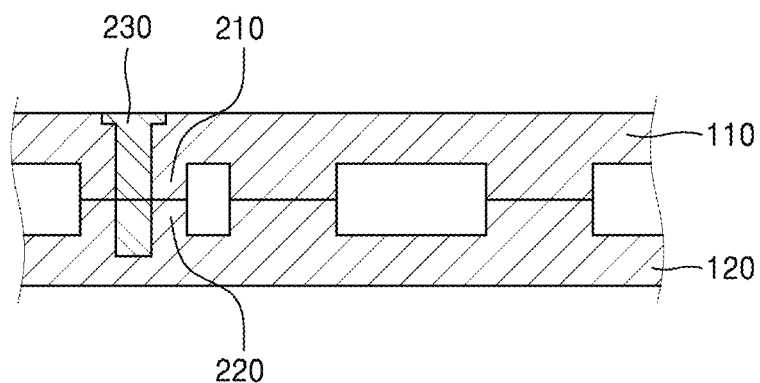
FIG. 7 is a partial cross-sectional view showing an example in which a plurality of first and second reinforcement ribs according to the present invention are coupled through the mechanical fastening.

FIG. 7 is a partial cross-sectional view showing an example in which a plurality of first and second reinforcement ribs according to the present invention are coupled through the mechanical fastening.

Referring to FIG. 7, the ends of the first and second reinforcement ribs 210 and 220 are disposed in a state adhere to each other.

Next, the first and second reinforcement ribs 210 and 220 also may be mechanically coupled in multiple locations through a fastening member 230 such as a separate fastening bolt.

Figure 8:
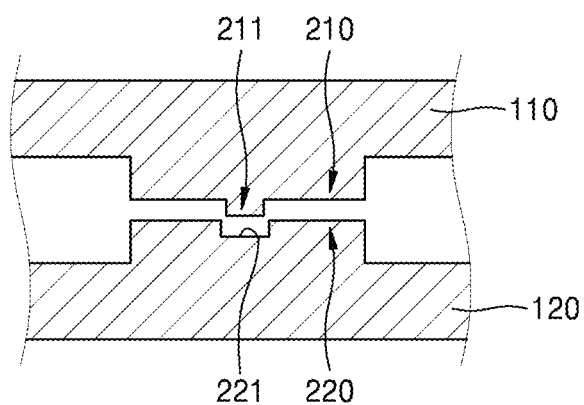
FIG. 8 and FIG. 9 are the partial cross-sectional views showing an example in which a plurality of first and second reinforcing ribs according to the present invention are coupled through mechanical fitting.
Figure 9:
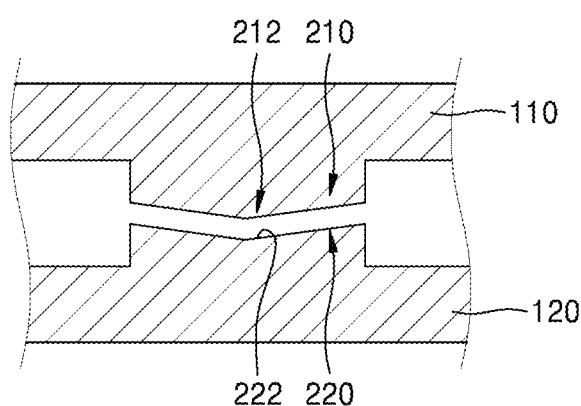

FIG. 8 and FIG. 9 are partial cross-sectional views showing an example in which a plurality of first and second reinforcement ribs according to the present invention are coupled through fitting coupling.

Also, referring to FIG. 8 and FIG. 9, the first and second reinforcement ribs 210 and 220 may be coupled to each other by fitting coupling.

In case of FIG. 8, a fitting protrusion 211 protruding at an end of the first reinforcement rib 210 is formed, and a fitting groove 221 is formed at an end of the second reinforcement rib 220.

Therefore, when the front frame 110 and the back frame 120 are coupled to each other, the first and second reinforcement ribs 210 and 220 are adhered with each other and the fitting protrusion 211 is coupled to being fitted into the fitting groove 221

In addition, in case of FIG. 9, the pointed protrusion 212 is formed downward at the end of the first reinforcement rib 210 and the grooves 222 at which the pointed protrusion 212 is fitted at the ends of the second reinforcement ribs 220 may be also formed.

Therefore, when the front frame 110 and the back frame 120 are coupled to each other, as the first and second reinforcement ribs 210 and 220 are adhered to each other, the pointed protrusion 212 may be coupled by being fitted into the groove 222.

Of course, as in FIG. 8 and FIG. 9, after the first and second reinforcement ribs 210 and 220 are coupled by fitting, a mechanical coupling may be performed using a separate fastening member (see FIG. 6).

In particular, in the case of FIG. 9, there is an advantage of positioning that the pointed protrusion 212 is inserted into the pointed groove 212 to guide the first and second reinforcement ribs 210 and 220 to make a normal coupling.

The normal coupling may be a state in which the ends of the first and second reinforcement ribs 210 and 220 are coupled in a state being not distorted from each other.

Figure 10:
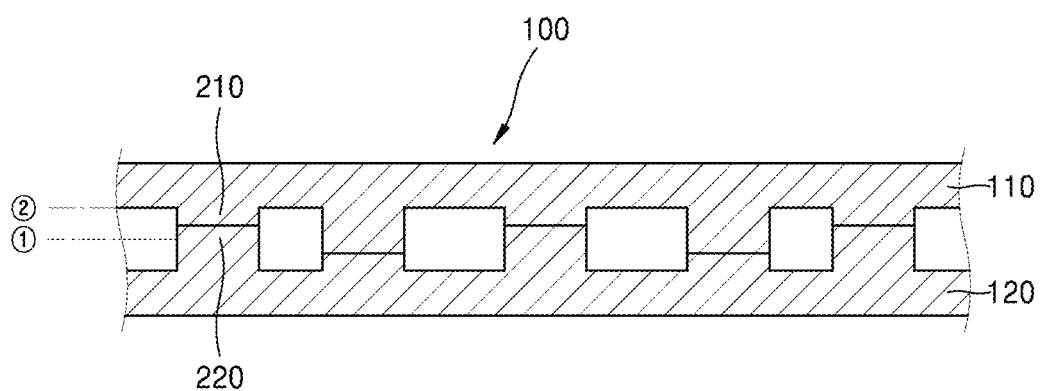
FIG. 10 is a sectional view showing a modified example of the coupling location of the first and second reinforcement ribs according to the present invention.

FIG. 10 is a sectional view showing a modified example of the coupled location of the first and second reinforcement ribs according to the present invention.

Referring to FIG. 10, the end locations of the first reinforcement ribs 210 may be formed differently from each other. Also, the locations of the second reinforcement ribs 220 may be also formed differently from each other so as to be adhered with the ends of the first reinforcement rib.

Here, the position is a coupling location of the ends of the first and second reinforcement ribs 210 and 220, and accordingly, the protruded lengths of the first and second reinforcement ribs 210 and 220 may be formed differently from each other.

The overall coupled location may be formed in a shape that forms the zig-zag along the width direction or the longitudinal direction of the frame part 100.

According to the configuration thereof, when an impact is applied to the frame part 100 coupled to each other, the distortion to the lateral direction may be further efficiently prevented, by forming the length thereof differently such that the zig-zag shape is formed at the ends of the first and second reinforcement fibs 210, 220 which the coupling site between the front frame 110 and the back frame 120.

Next, a method of manufacturing the seat back frame of the present invention will be described.

Figure 11:
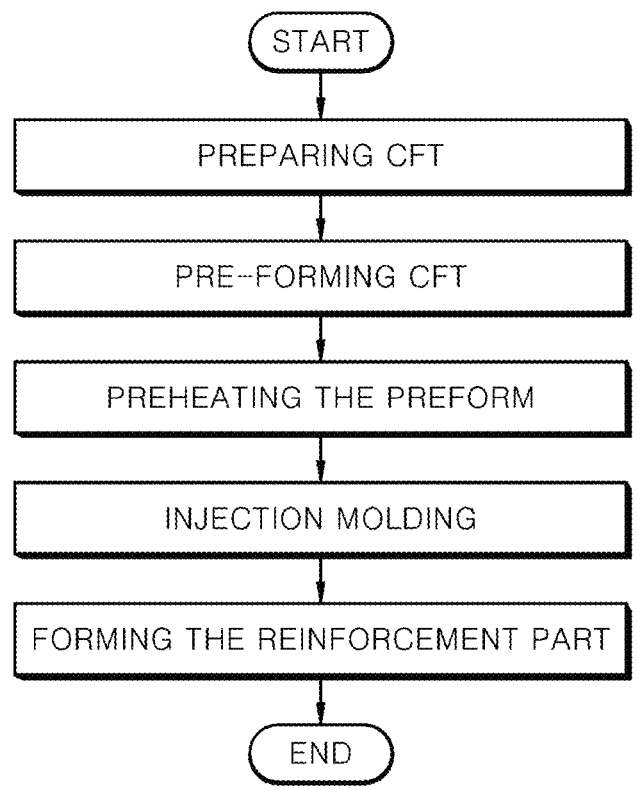
FIG. 11 is a flow chart showing a method of manufacturing a CFT pre-forming insert injection molded sheet back frame of the present invention.
Figure 12:
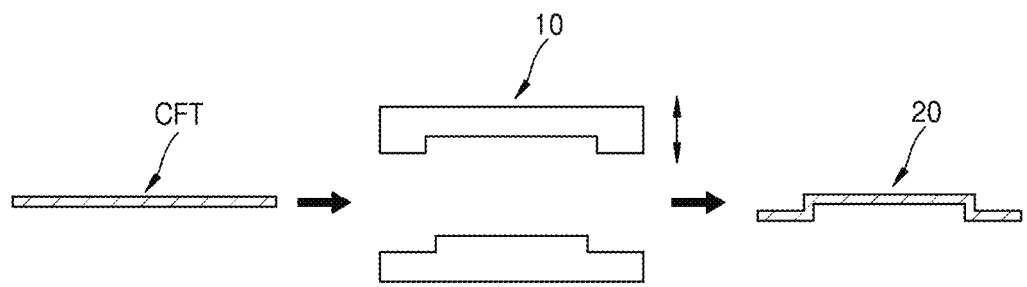
FIG. 12 is a view showing a pre-forming molding step according to the present invention.
Figure 13:
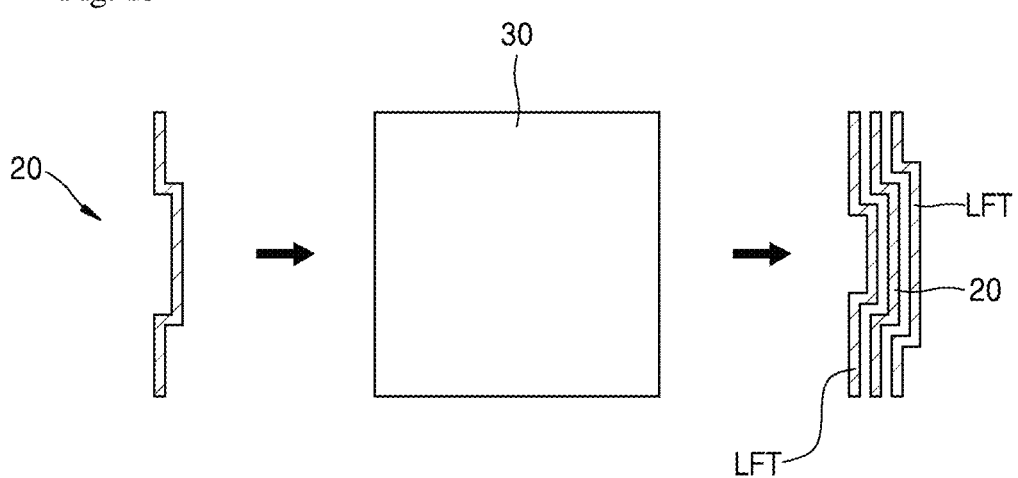
FIG. 13 is a view showing an injection molding step according to the present invention.

FIG. 11 is a flow chart showing a method of manufacturing a CFT pre-forming insert injection molded sheet back frame according to the present invention, FIG. 12 is a view showing a pre-forming molding step according to the present invention, and FIG. 13 is a view showing an injection molding step according to the present invention.

Referring to FIG. 11, the CFT pre-forming insert injection molded sheet back frame of the present invention is manufactured through a pre-forming molding step to an injection molding step. The reference numerals of the CFT pre-forming insert injection molded seat back frame of the present invention will be described with reference to FIG. 1, FIG. 2, FIG. 3, FIG. 4, FIG. 5, FIG. 6, FIG. 7, FIG. 8, FIG. 9, FIG. 10.

Pre-Forming Molding Step

Referring to FIG. 11 and FIG. 12, a continuous fiber reinforced thermoplastic (CFT) and a pre-forming molding die 10, which is a press molding apparatus for molding a predetermined shape, are prepared.

The pre-forming molding mold may be classified into an upper mold and a lower mold.

The continuous fiber reinforced thermoplastics (CFT) prepared is placed between the upper and lower molds.

Then, it is formed to the pre-forming molding 20, by coupling the upper mold and the lower mold and pressing the continuous fiber reinforced thermoplastic (CFT) to have the predetermined shape.

Injection Molding Step

The pre-forming mold 20 is preheated to a determined temperature.

The injection material is input into the injector 30 and injection molded. In this case, the injection material may be used by including any one or at least one or more of the long fiber and short fiber reinforced thermoplastics.

Therefore, the long fiber reinforced thermoplastic resin (LFT) is formed to have a predetermined on the outer surface of the preform 20 through am injection molding, and at this time, the reinforcement part 200, that is, the first reinforcement rib 210 or the second reinforcement rib 220 is also formed simultaneously, so that the frame part 100 and the reinforcement part 200 are manufactured.

In the present invention, the continuous fiber reinforced thermoplastic (CFT) is embedded in the inside of the seat back frame, so that its own strength and rigidity can be secured.

Figure 14:
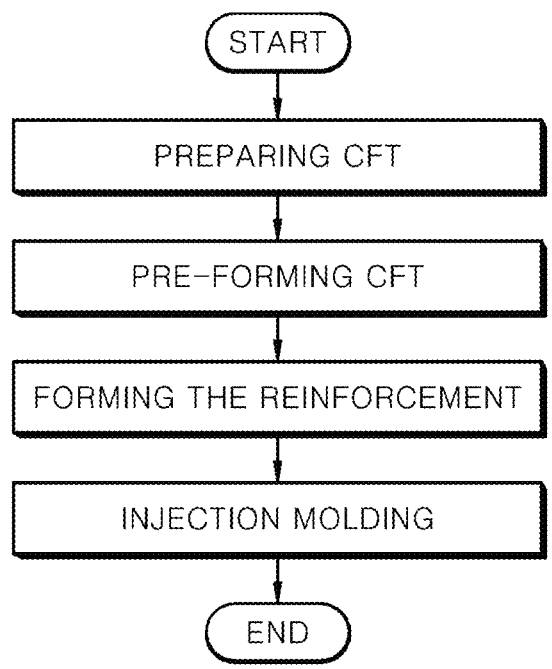
FIG. 14 is a flow chart showing another method of manufacturing the CFT pre-forming insert injection molded seat back frame of the present invention.

FIG. 14 is a flow chart showing another method of manufacturing the seat back frame of the present invention.

Meanwhile, referring to FIG. 14, the reinforcement part 200 according to the present invention may be also formed in the pre-forming molding step.

That is, the pre-forming molding 20 is formed which the reinforcement parts 200 are formed by applying it to be the determined shape through the pre-forming.

Here, in the pre-forming mold 10, a shape of molding the reinforcement parts 200 is prepared in advance.

Then, the pre-forming molding 20 is injection molded using the LFT to produce a seat back frame.

Figure 15:
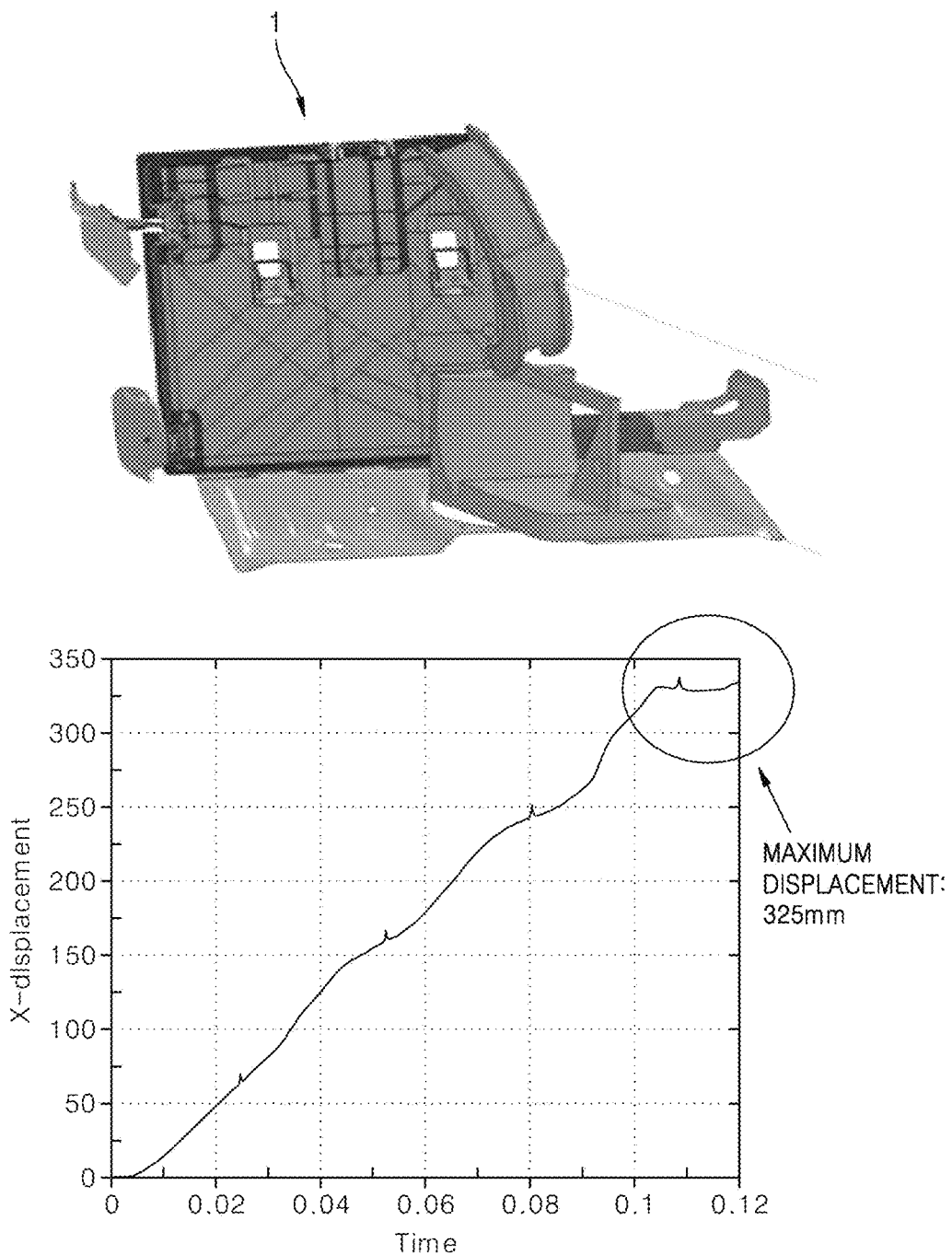
FIG. 15 is a view showing an analytical shape of a seat back frame and a displacement amount measurement result according to a Comparative Example.
Figure 16:
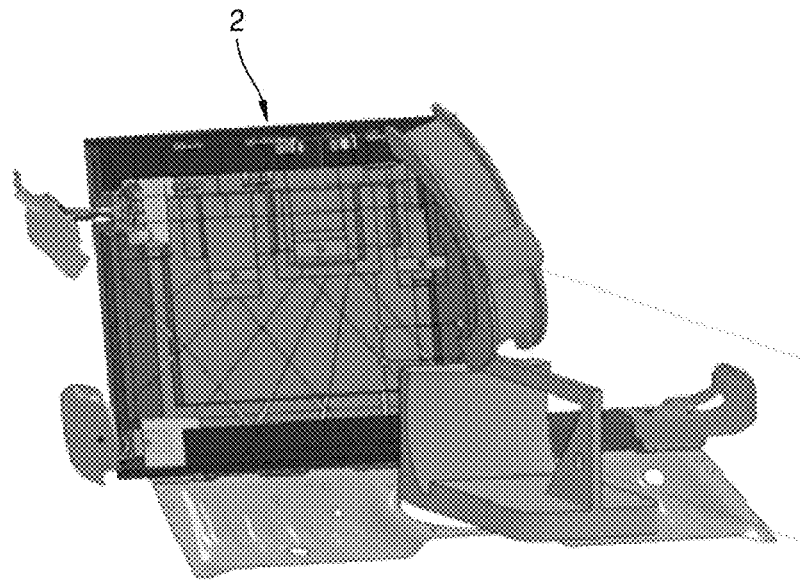
FIG. 16 is a view showing the analytical shape of the seat back frame and the measurement result of the displacement amount according to Embodiment 1.
Figure 16:
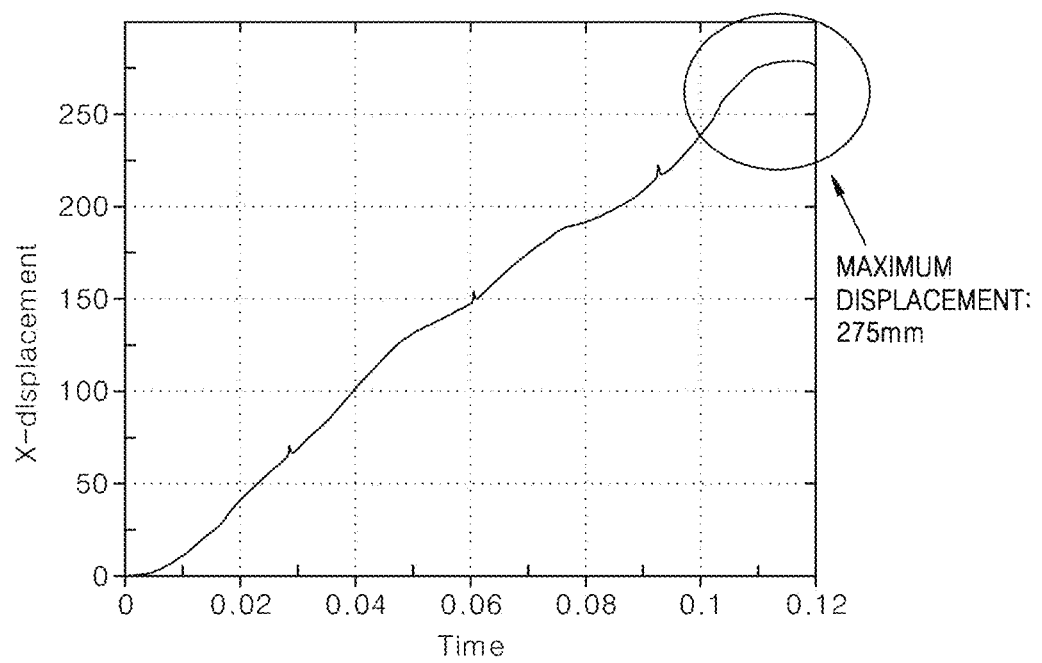
Figure 17:
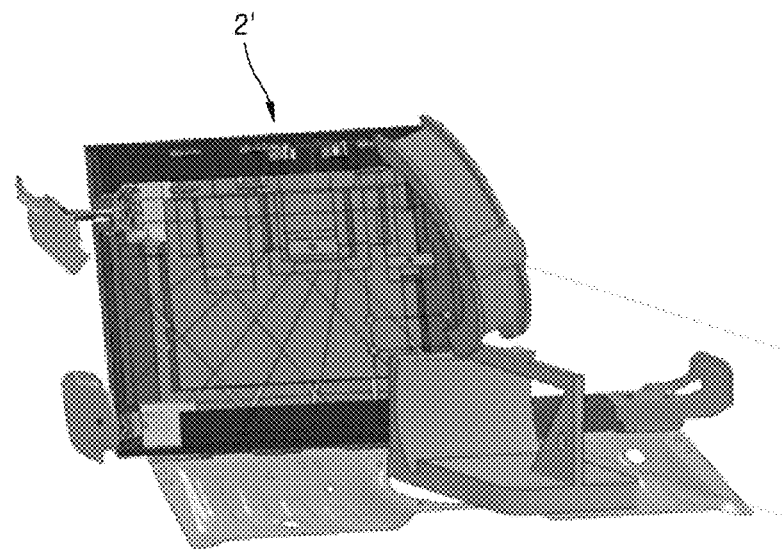
FIG. 17 is a view showing the analytical shape of the seat back frame and the measurement results of the displacement amount according to Embodiment 2.
Figure 17:
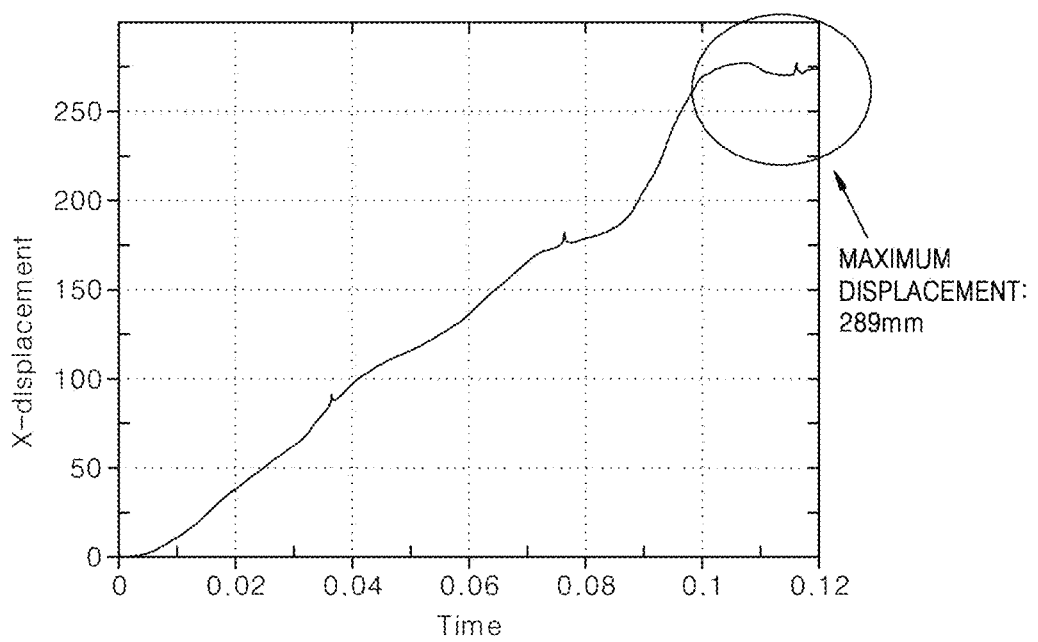

FIG. 15 is a view showing an analytical shape and a displacement amount measurement result of a seat back frame according to a Comparative Example, FIG. 16 is a view showing an analytical shape and a displacement amount measurement result of a seat back frame according to the Embodiment 1, FIG. 17 is a view showing an analytical shape and a displacement amount measurement result of a seat back frame according to the second embodiment.

Embodiment 1 is a case in which the reinforcement ribs are formed in both of the front frame and the back frame, and Embodiment 2 shows the analytical shape and the displacement amount measurement result in the case where the reinforcement rib is formed only in the front frame.

The displacement amount results of the seat back frame according to the Comparative Example and Embodiments 1 and 2 will be described with reference to FIG. 15, FIG. 16 and FIG. 17.

Embodiments 1 and 2 have a pair of frame parts and reinforcement parts according to the present invention.

In the comparative example, it is the constitution of forming the flat plate shape that the separate reinforcement rib is not existed in the front frame and the reinforcement rib is formed only in the back frame.

Further, in Embodiment 1, the reinforcement rib is formed in both the front frame and the back frame, and Embodiment 2 shows a case in which the compensation rib is formed only in the front frame.

The test conditions are as follows.

A load of 2 tons is applied forward to the seat back frame (1, 2, 2') of each of the Comparative Example and Embodiments 1 and 2.

At this time, the displacement amounts of the seat back frames 1, 2, 2' protruding forward at the initial location are generated.

The amount of displacement is measured with the state before the load of 2 tons forward is applied to the seat back frame (1, 2) of each of the Comparative Example and Embodiments 1 and 2, as a zero point.

As a result, in the case of the Comparative Example, the maximum displacement amount of the seat back frame 1 was measured to be 325 mm, and the maximum displacement amount of the seat back frame 2 of Example 1 was measured to be 275 mm.

Further, the maximum displacement thereof of the seat back frame of Embodiment 2 shown in FIG. 17 is measured to be 289 mm.

Therefore, in the case of Example 1, it is shown that the displacement amount of 50 mm is smaller compared to the Comparative Example.

Further, in the case of Embodiment 2, it is shown that the displacement amount of 36 mm is smaller compared to the Comparative Example.

By the result thereof, it can be seen that the degree of frame deformation in Examples 1 and 2 is smaller than that in Comparative Example, that is, the rigidity is more secured.

In addition, as seen from the results of Example 2, even when the reinforcement rib is formed only on the front frame, it is confirmed that the displacement amount of the seat back frame is pushed shorter than that of the Comparative Example.

According to the above-described configuration and action, in the embodiment according to the present invention, a plurality of ribs symmetrical to each other can be formed on the coupling surfaces of each of a pair of frames which are coupled to face each other, thereby securing its own strength and rigidity.

Further, in the embodiment according to the present invention, it is possible to increase the strength of the rib itself by molding a plurality of ribs in the injection molding after pre-forming molding the continuous fiber reinforced thermoplastics.

In addition, even if the reinforcement rib is applied only to the front frame, since the displacement amount is shorter than that of the conventional or Comparative Example described above, the present invention has an advantage of reducing the manufacturing cost while increasing the rigidity.

Although the specific embodiments of the seat back frame of the present invention have been described above, it is apparent that the various implementing variations can be made within the limit without departing from the scope of the present invention.

Therefore, the scope of the present invention should not be limited to the embodiments described, and should be determined by the equivalents of claims, as well as the following claims.

That is, it is to be understood that the above-described embodiment is illustrative and not restrictive in all aspects and that the scope of the present invention is indicated by the appended claims which will be described later rather than the detailed description, and it is to be understood that all alternations or changed forms derived from the meaning, the range, and the equivalent concept thereof are included within the scope of the present invention.

The invention claimed is:

1. A CFT pre-forming insert injection molded seat back frame, comprising:
   a pair of frame parts which are coupled to face each other and have fiber reinforced plastic formed therein; and
   reinforcement parts which are formed on regions that the pair of frames respectively face, and are coupled to each other in multiple locations,
   wherein
   the reinforcement parts comprise
      a plurality of first reinforcement ribs which are protrusions formed on a first coupling region, and
      a plurality of second reinforcement ribs which are protrusions formed on a second coupling region,
   the plurality of first reinforcement ribs and the plurality of second reinforcement ribs are coupled to each other by mechanical fastening using a fusion or a fastening bolt,
   a pointed protrusion is formed downward at an end of the plurality of first reinforcement ribs, and an groove at which the pointed protrusion is fitted is formed at an end of the plurality of second reinforcement ribs.

2. The CFT pre-forming insert injection molded seat back frame according to claim 1,
wherein the pair of frame parts includes
a front frame which the first coupling region is formed on one surface, and
a back frame which the second coupling region facing with the first coupling region is formed, and
wherein a facing region comprises the first coupling region and the second coupling region.

3. The CFT pre-forming insert injection molded seat back frame according to claim 1, wherein
the plurality of first reinforcement ribs and the plurality of second reinforcement ribs have a shape symmetrical to each other.

4. A CFT pre-forming insert injection molded seat back frame, comprising:
a pair of the frame parts comprising a front frame and a back frame coupled to the front frame; and
reinforcement parts comprising a plurality of first reinforcement ribs formed on the front frame,
wherein
the plurality of first reinforcement ribs are protrusions formed at a first coupling region,
the reinforcement parts further comprise a plurality of second reinforcement ribs which are protrusions formed on a second coupling region,
the plurality of first reinforcement ribs and the plurality of second reinforcement ribs are coupled to each other by mechanical fastening using a fusion or a fastening bolt,
a pointed protrusion is formed downward at an end of the plurality of first reinforcement ribs, and
a groove at which the pointed protrusion is fitted is formed at an end of the plurality of second reinforcement ribs.

5. The CFT pre-forming insert injection molded seat back frame according to claim 1, wherein
the reinforcement parts comprise the fiber reinforced plastic.

6. The CFT pre-forming insert injection molded seat back frame according to claim 1, wherein
the pair of the frame parts are manufactured
by forming to a pre-forming molding by pressing it in order to have a determined shape through the pre-forming molding, and
by injection molding the pre-forming molding by using the other thermoplastic while simultaneously forming the reinforcement parts.

7. The CFT pre-forming insert injection molded seat back frame according to claim 1, wherein
the pair of the frame parts are manufactured
by forming to a pre-forming molding which the reinforcement parts are formed by pressing it in order to have a determined shape through the pre-forming molding, and
by injection molding the pre-forming molding by using the other thermoplastic.

8. The CFT pre-forming insert injection molded seat back frame according to claim 4, wherein
the reinforcement parts comprise the fiber reinforced plastic.

9. The CFT pre-forming insert injection molded seat back frame according to claim 4, wherein
the pair of the frame parts are manufactured
by forming to a pre-forming molding by pressing it in order to have a determined shape through the pre-forming molding, and
by injection molding the pre-forming molding by using the other thermoplastic while simultaneously forming the reinforcement parts.

10. The CFT pre-forming insert injection molded seat back frame according to claim 4, wherein
the pair of the frame parts are manufactured
by forming to a pre-forming molding which the reinforcement parts are formed by pressing it in order to have a determined shape through the pre-forming molding, and
by injection molding the pre-forming molding by using the other thermoplastic.

* * * * *